Aug. 11, 1925.
A. CAPROTTI
1,549,712
VALVE GEAR FOR REVERSING STEAM ENGINES
Filed Oct. 22, 1921     4 Sheets-Sheet 3
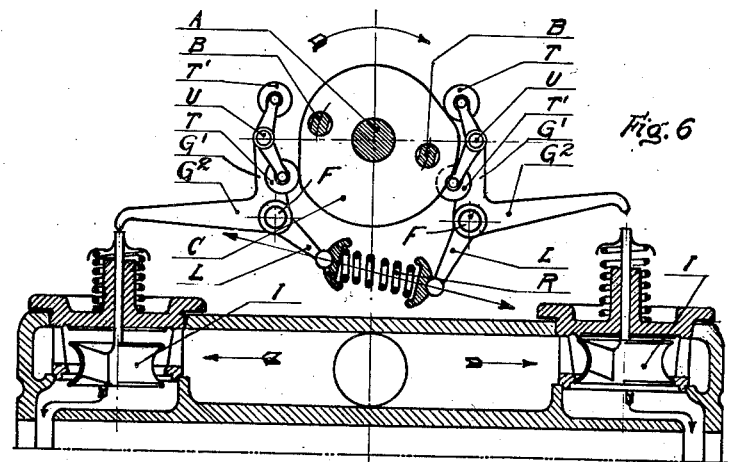
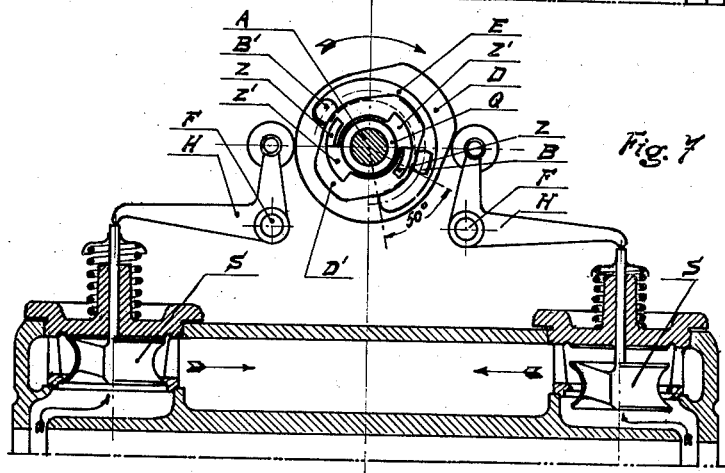
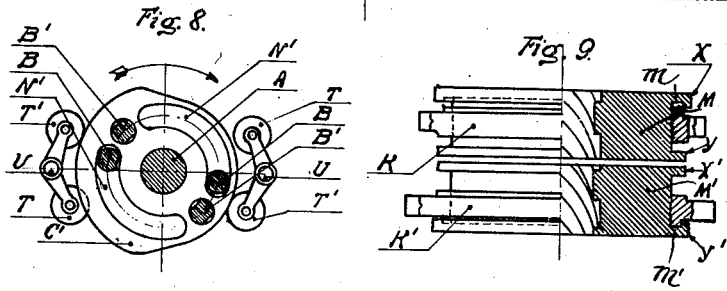
Inventor
A. Caprotti,
By Marks&Clerk
Attys.

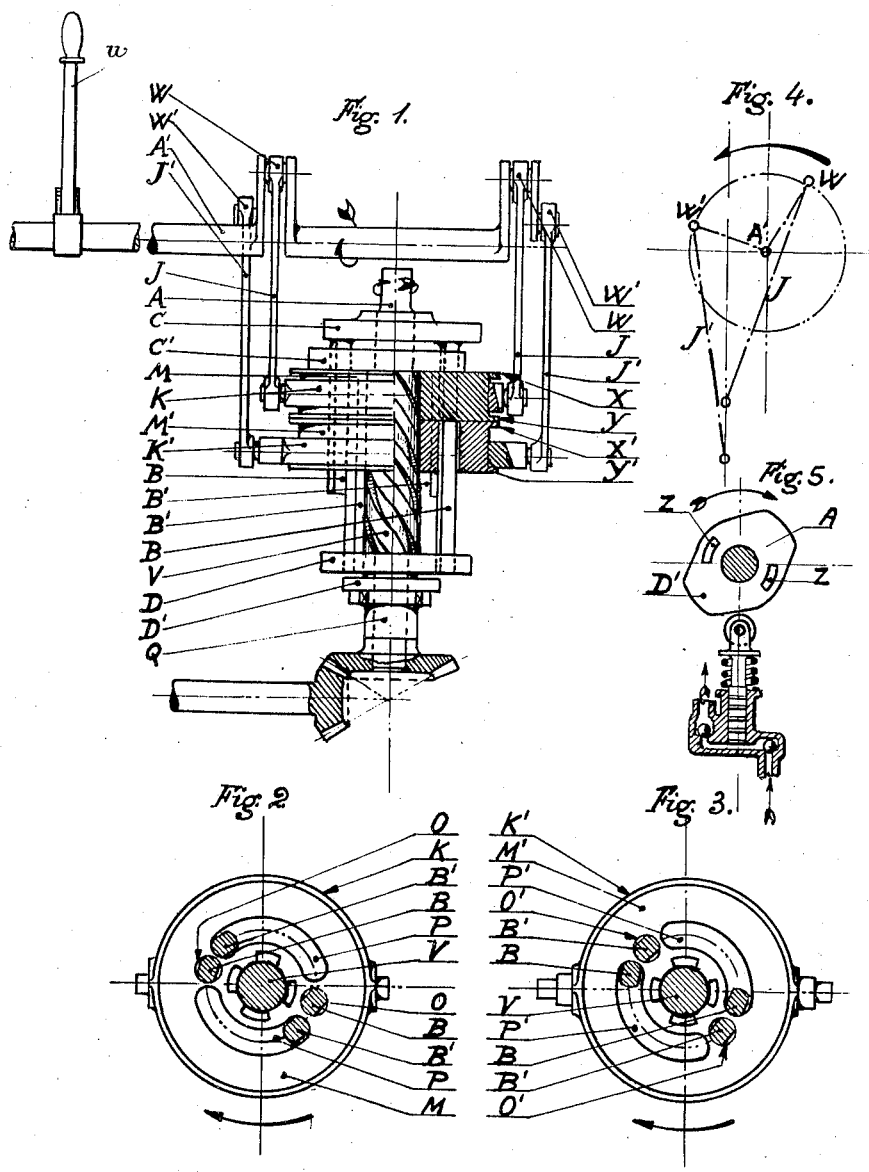

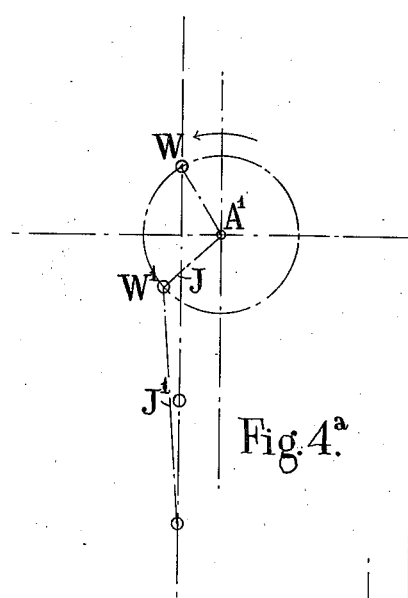
Fig. 4ª.
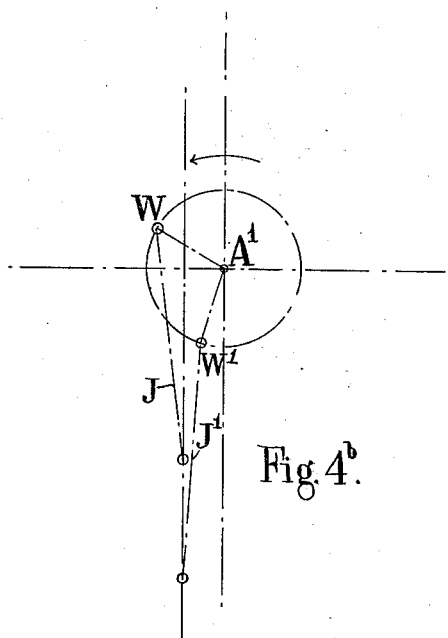
Fig. 4ᵇ.
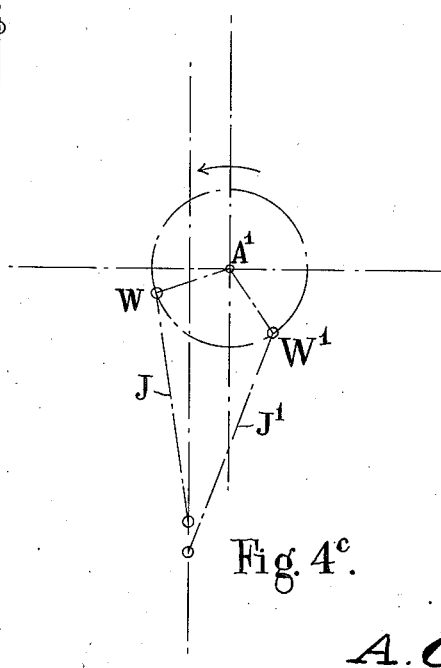
Fig. 4ᶜ.

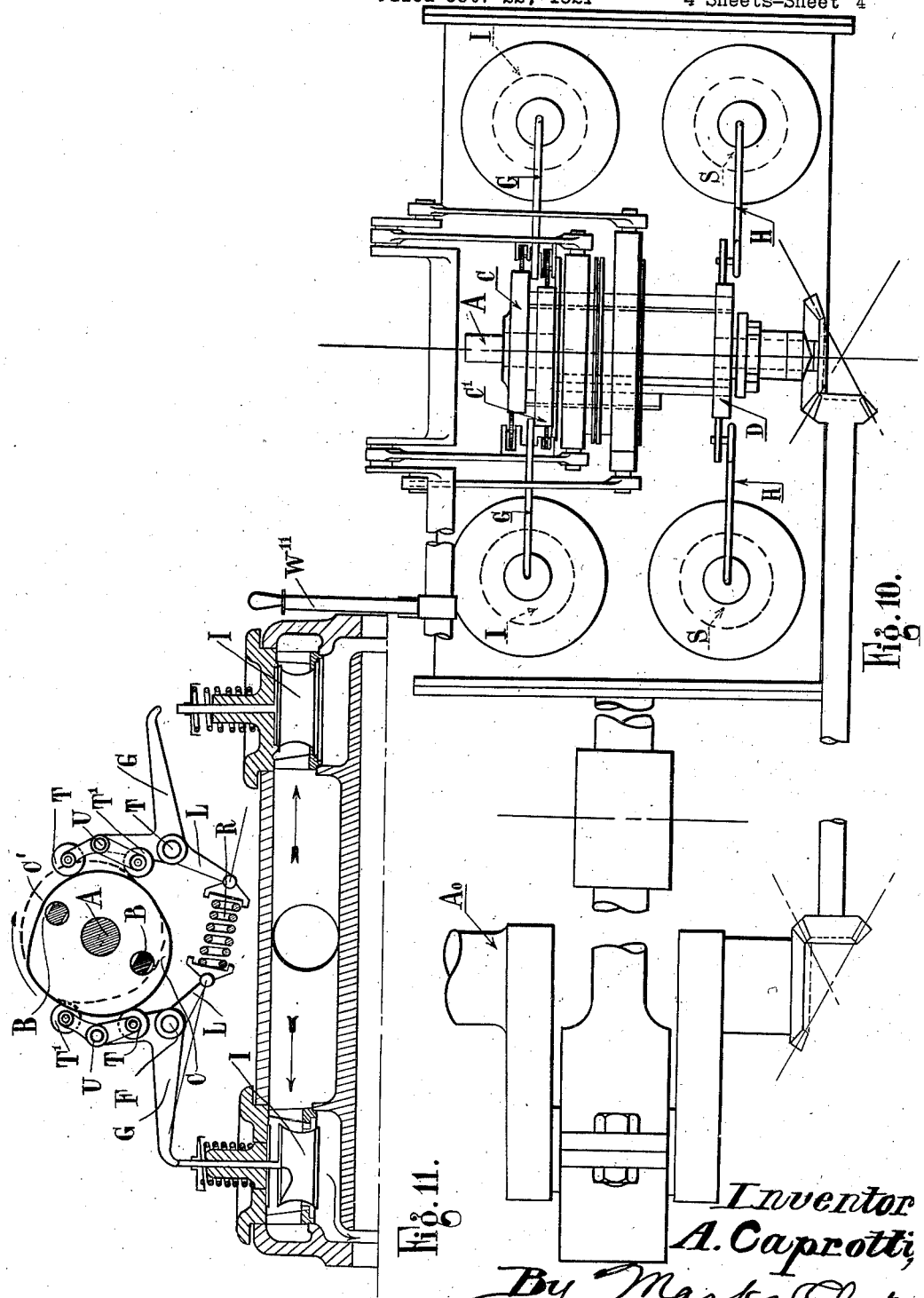

Patented Aug. 11, 1925.

1,549,712

UNITED STATES PATENT OFFICE.

ARTURO CAPROTTI, OF MILAN, ITALY.

VALVE GEAR FOR REVERSING STEAM ENGINES.

Application filed October 22, 1921. Serial No. 509,605.

*To all whom it may concern:*

Be it known that I, ARTURO CAPROTTI, a subject of the King of Italy, and residing at Via Pergolesi 2, Milan, Italy, have invented certain new and useful Valve Gears for Reversing Steam Engines, of which the following is a specification.

This invention has for its object a new valve gear for reciprocating steam engines specially adapted for locomotives and wherein the phases of the opening and closing of the admission and exhaust passageways are so dependent one on the other that the valve gear satisfies all the conditions theoretically required for the best utilization of the steam.

The accompanying drawings illustrate diagrammatically a constructional form of this invention applied to a locomotive engine.

Fig. 1 is a view of the cam-shaft and the reversing gear,

Fig. 2 shows the sleeve which controls the opening cam for the inlet valve during forward running, Fig. 3 shows the sleeve which controls the closing cam for the inlet valve during the forward running, Fig. 4 diagrammatically illustrates the position of the reversing shaft corresponding to Fig. 1, Figs. $4^a$, $4^b$, $4^c$ show alternative positions of the reversing shaft corresponding to Fig. 4 for different conditions of running of the engine, Fig. 5 shows a device for counteracting the accelerating forces on the exhaust cam, Fig. 6 shows the mechanism for operating the inlet valves from the inlet cams.

Fig. 7 shows the mechanism for operating the exhaust valve from the exhaust cam, Fig. 8 shows the closing cam for the inlet valves, and part of the mechanism for operating said inlet valves, Fig. 9 shows an alternative construction for the sleeves controlling the inlet valves, including the straps operating said sleeves.

Fig. 10 is a complete assembly drawing, diagrammatically showing in plan the valve gear with the cylinder and the mainshaft.

Fig. 11 is a view showing the mechanism in Fig. 6 in another position, the cam C' being here indicated in dotted lines.

On the distribution shaft A (see Figures 1, 5, 6, 7, 8 and 10) which rotates at the same speed as the crank shaft $A_0$ are loosely mounted the cam C which serves only to control (in the forward running of the engine, i. e. in the direction of the arrow) the opening of the admission passageway and the cam C' which serves only to control the closing of the same passageway.

Two rods are connected to each cam, such rods being parallel to the distribution shaft and diametrically opposed. As shown in Figure 1, rods B are connected to the cam C and rods B' to the cam C'. On the same shaft A is a screw V having a multiple thread and quick pitch. Mounted on such screw and in engagement therewith are two grooved sleeves M and M' in each of which are formed two holes and two slots, as indicated in Figures 2 and 3.

Through the holes O in the sleeve M pass the rods B, whilst through the holes O' in the sleeve M' pass the rods B'. The latter pass through the slots P in sleeve M whilst the rods B, after having passed through the holes O, pass through the slots P' in sleeve M'. The rods B must also pass through the cam C' and to allow for this the said cam is provided with suitable slots N'. The length of these slots is such as to permit a lead of the connected pieces C and M relatively to the connected pieces C' and M' or vice versa; these leads are established so as to regulate the phases of the distribution and their extent is more particularly brought out hereafter.

A third cam D is loosely mounted on a shaft A (Figures 1 and 7 and 10). Such cam serves for operating the exhaust, and its shape is substantially that of an ordinary radial cam. This cam is provided with teeth Z whereby it can be rotated by the teeth Z' of the member Q keyed to the shaft A. The said cam is also provided with a slot E into which extend the extremities of one of the rods B and one of the rods B'.

The shaft A is disposed transversely of the cylinder axis, and mounted parallel to said shaft are axles F (Figures 6 and 7) about which can swing the bell-crank levers G and H, adapted to act respectively upon the admission valves I and exhaust valves S. Such valves are shown as double seat poppet valves, but if desired they can be of any other type. Each lever G is formed with three arms $G_1$, $G_2$ and L.

In order to actuate the valves I, each lever G is supplied with a rocking beam adapted to swing about the pivot U at the end of the arm $G_1$ and having rollers T, T' mounted respectively at its ends. The rollers T of the two beams are disposed in a position diametrically opposed, and are adapted to engage with the cam C, while the rollers T' which are also diametrically opposed, are disposed in another plane, and are adapted to engage with the cam $C^1$, (Figure 8). Between the ends of the lever-arms L is placed the spring R by the effect of which the contact between the rollers T and T' and their co-operating cam surfaces is ensured. Flanges X, Y, X' and Y' (Figures 1 and 9) of the sleeves M and M' can be operated on by the straps K and K' situated in the recesses between such flanges, such straps being displaced in a direction parallel to shaft A by crank pairs W and W' on the reversing shaft A' and corresponding pairs of connecting rods J and J'. The reversing shaft is adapted to be angularly displaced by the engine driver by means of the hand lever $w$ indicated in Fig. 1.

The width of the straps K and K' is smaller than that of the recesses between the flanges X and Y and X' and Y', so as to allow of a lost motion between the straps and sleeves. The object of this lost motion is to allow one of the sleeves M to remain in a fixed position against a fixed stop during the time the reversing shaft A' is turned through a considerable angle, so as to effect a considerable movement of one cam (M') while the other (M) remains motionless. This corresponds to keeping the amount of steam lead constant while the position of the cut-off of steam is varied through a fairly large angle, which is a desired effect to be aimed at in steam engine valve gear.

To the cam D is keyed a cam D' (see Figures 1, 5 and 7) which drives an oil circulating pump having a plunger piston and a spring which when compressed serves to return the piston.

The valve gear is represented in Fig. 1 in the position of the maximum degree of admission in forward running and in this condition the strap K' contacts with the flange Y', while the strap K is situated out of contact with both the flanges X and Y'; the sleeve M lies adjacent the cam C', the rods B of the cam C pass through the slots N' of cam C', and slots P' of sleeve M', in the most forward extremity thereof relative to the direction of rotation, and the rods B' of the cam C' pass through the slots P of sleeve M in the rearward extremity thereof relative to the direction of rotation. Finally the teeth Z' on member Q fixed on the shaft A act upon the teeth Z on the cam D, in such a manner as to rotate the cam in the direction indicated by the arrow (Figure 7) and as regards the ends of the rods B and B', which extend into the slot E, the former is situated at a considerable distance from either of the extremities of the said slot and the second near to the rearward extremity thereof relatively to the direction of rotation indicated by the arrow.

The combined driving of the same admission valve by two distinct cams C and C' of which one controls only the opening and the other controls only the closing, is realized as follows:—

The two cams have the same shape, this comprising two circular arcs of equal angular extent but of different radius, connected together at diametrically opposed positions by two connecting curves designed so as to avoid imparting any rude or too rapid change of speed to the levers and to the valves, and each having the angular width of about 40°; each of the rocking beams carrying the rollers T, T', can assume four different positions, and the relative positions of the two cams at the maximum admission degree, as illustrated by the drawings, and the length of the valve stem, are so regulated that the said four different positions of each rocking beam follow each other in the following order and with the following results:

1. The roller T is on the curve of smaller radius and T' is on the curve of greater radius; the axis U is in its mid position and the valve is closed.

2. The roller T passes on to the curve of greater radius, and as roller T' remains on the curve of greater radius the pivot U is moved outward relatively to the shaft A and the corresponding valve I is opened.

3. The roller T' passes from the curve of greater radius to that of smaller radius, and as the roller T remains on the curve of greater radius the pivot U is again moved into the mid position, and the valve I closed.

4. The roller T passes from the curve of greater radius to that of smaller radius, both rollers being thus on the curve of smaller radius the pivot U is moved into its position nearest the shaft A, and the extremity of the horizontal arm of the bell-crank lever G will be removed from the end of the valve stem.

From the fourth position the rocking beam returns to the first when T' remounts onto the curve of greater radius; the above return takes place at 180° after the passage of roller T' onto the curve of smaller radius, which had the effect of closing the valve.

Evidently, these different positions of each rocking beam as aforementioned are not assumed by both these beams simultaneously, but with a difference of phase of 180°, so that while the left hand beam passes through its successive positions in the order 1, 2, 3 and 4, the right hand beam passes through the positions in the order 3, 4, 1 and 2. In the position shown in the drawing the piston is supposed to be at the left dead centre and therefore the left hand valve I and right hand valve S are both opening. The opening obtained in this position corresponds to the admission lead and exhaust lead by the slide valve gear.

The rotation of the main shaft effects the rotation of the shaft A and the valves are first full opened and then closed and the closing of the admission valve will take place precisely when the roller T' passes down the descending connecting curve of the cam C' and the exhaust valve will be closing when the roller of the bell crank lever H passes down the descending curve of the cam D.

While the axis of any roller is stationary, as when the roller is engaging with a part of the cam surface which is in the form of an arc of a circle with its centre on the axis of A, any pressure of the roller on the cam will exert a force on the cam purely due to friction, and this has always a tendency to retard the motion of the cam. When however the roller is engaging with one of the connecting surfaces between the two opposed circular surfaces of the cams C, or on the ascending or descending surfaces of the cam D, the said roller exerting a force on said surface will effect a delaying or an accelerating action on the cam according as to whether the surface is approaching or leaving said roller.

For the regular and correct working of the valve gear it is necessary that the accelerating forces shall never exceed the delaying forces during normal running. When such a condition is realized, then the screw V will always have a tendency to move the sleeves M and M' in one direction longitudinally during forward running of the engine, and always in the opposite direction during backward running of the engine; and similarly the teeth Z of the exhaust cam will also, during the forward or backward running, always tend to keep in engagement with the forward or backward edges respectively of the driving teeth Z', and thus in both cases any relative movement between the members of the lost motion device will be prevented during the normal running of the engine. As regards the admission cams it must be noted that, owing to their shape and to the fact that the two rollers lying on the same cam are diametrically opposed, while the roller corresponding to one of the arms $G_1$ is moved away from the cam axis, the roller corresponding to the other arm $G_1$ approaches the said axis; thus, while one of the rollers has a tendency to delay rotation, the other has a tendency to accelerate it. The force with which a roller presses against the cam is proportional to the sum of the moments of the forces acting on its corresponding lever G and calculated around the axis of the corresponding axle F. These forces consist of the reaction of the spring R, and the upward force due to the closing spring of the valve I and the steam pressure on the valve, if this valve is not perfectly balanced. These two latter forces (valve spring and steam pressure) operate to accelerate or retard an admission cam only during the opening and the closing of the valves, i. e. in the passage from first to second and from second to third position of the rocking beam, while in the passage from third to fourth and from fourth to first positions, as the lever G does not engage the stem of the valves, the said lever is not subjected to the influence of the valve. In order that the final resultant action by the opposed rollers on the cam affected shall not be to accelerate said cam, it is necessary that the resultant of the two actions, (accelerating force due to one roller and delaying force due to the other), shall always be a delaying force, or at least an accelerating force of less value than the delaying force due to friction. If the forces due to friction were such as to just equalize the resultant accelerating action due to the valve spring, the spring R would only have the function of maintaining the rollers on the rocking beams in contact with the cams, but as this equalization is not usually obtained, it is necessary that the spring R should act on the different levers G with different effects, according as to which lever is in contact with and thus acted upon by its valve. Thus when a lever G is being removed out of contact with the corresponding valve stem, the spring R ought to act with a greater leverage on said lever in order to counteract the force exerted on the other lever G by its corresponding valve stem. This effect is obtained by the arrangement shown in Figure 6; in the position illustrated, i. e. while the left valve I is open and thus pressing on the corresponding lever G, the spring R reacts on both the levers G in the direction of the arrows, but with less leverage on the left lever G than on the right lever. The converse occurs when the right valve I is open and the left valve I closed.

Fig. 11 shows the mechanism of Fig. 6 in another position, and in this Fig. 11, it will be seen that the roller T' on the left hand lever G is tending to accelerate the cam C', while the roller T' on the right hand lever G is tending to retard the same cam C'. If the spring R were dispensed with, then the left hand roller T' would still tend to accelerate the cam, while there would be no retarding force exerted by the right hand roller T': thus an accelerating effect would then result. Thus it is seen that this accelerating effect is obviated by the action of the spring R, which acts upon the two levers G with different leverages.

As the object is not to balance the push of the valves perfectly but only to prevent the accelerating force due to the push of one roller at any moment exceeding the delaying force due to friction or to the push of the other roller, such can easily be obtained by correctly proportioning the maximum and minimum efforts of the spring R and also by suitably proportioning the length of the arms L, and fixing their angular position relatively to the horizontal arms of the levers G. The exhaust cam must not be compelled to accelerate as regards the shaft. The forces on the exhaust cam cannot be balanced in the same manner as for the inlet cams, since, though diametrically opposed rollers are provided, the shape of the exhaust cam is different from that of the admission cams, for the exhaust period is less than 180°. Under these conditions it is not possible to balance directly the accelerating action of one roller with the delaying action of the other. But to effect the purpose desired, a second cam D' is provided and rigidly connected with the cam D (Figures 1, 5, 7) the shape and relation of the second cam D' being such that, while one of the exhaust rollers mounts on to the projecting part of the cam D, the roller of the oil pump (Fig. 5) descends under the action of the projecting part of the cam D', and while the first roller descends from the projecting part of the cam D, the oil pump roller ascends due to the removal of the projecting part of the cam D' from contact therewith. The said oil pump also pumps oil in the direction indicated in Fig. 5. Since the rollers controlled by the cam D are two in number and diametrically opposed, so the projections of the cam D' may be two and diametrically opposed.

When it is required to reduce the period of admission, the reversing shaft A' is turned in the direction of the arrow, so that, while the sleeve M does not move longitudinally (because the strap K has a free movement between the flanges X and Y limited by the play) the sleeve M' is moved in a direction away from the admission cams, so advancing the cam C' which has the effect of closing the admission valve I at an earlier period.

The dimensions of the various parts are so chosen that the gear operates in the following manner:—

When the reversing shaft A' is in the position indicated in Figs. 1 and 4, both sleeves M and M' are in their highest positions on the shaft A, and thus the cam C which controls the opening of the inlet valve, and the cam C' which controls the closing of the inlet valve, are both in their fully retarded positions. The engine is now running at full steam in the forward direction; and the strap K is situated out of contact with both the flanges X and Y while the strap K' is in contact with the flange Y' as shown in Fig. 1. In this position of the valve gear, the inlet valve opens a little before the crank of the engine mainshaft has reached its dead centre, and closes when the piston has completed about 80% of its power stroke.

If the position of the valve gear is now changed by slightly rotating the reversing shaft A' in the direction of the arrow (Fig. 4) by means of the hand wheel $w$, then the effect will be to move the sleeve M' along the screw V while the position of the sleeve M on the said screw V remains unaltered. This will cause the inlet valve to close earlier in the stroke of the engine, while the opening of the inlet valve is unaffected.

The said slight rotation of the reversing shaft A' will also cause the extremity of the rod B', which passes through the slot E of the exhaust cam D, to advance relatively to the said slot, but as the exhaust cam D is in this case rotated by the teeth Z' of the part Q, the timing of the exhaust valve will remain unaltered. The rod B which is connected with the opening cam C is of course not affected.

When the reversing shaft A' has been rotated in the direction of the arrow through about 60° from the position shown in Fig. 4 to the position indicated in Fig. 4ª, then the strap K will come into contact with the flange X, and due to the large displacement of the sleeve M', the closing of the inlet valve will be found to take place when the piston has completed about 11% of its power stroke, the opening of the inlet valve still taking place at the same point of the stroke about 12° before the dead centre.

After this, any further rotation of the shaft A' from the position of Fig. 4ª will move the sleeve M as well as the sleeve M', the former much quicker than the latter, and thus in addition to causing the inlet valve to close earlier, will also cause the opening of the inlet valve to occur earlier, so that the inlet valve will now open more than 12° before the dead centre, thus producing a condition of back-steam, that is, the admission of steam before the piston reaches its dead centre tending to drive the engine backwards.

This further rotation of the reversing shaft A' beyond the position of Fig. 4ª also causes the extremity of the rod B to move with the cam C and so to advance relatively to the slot E of the exhaust cam D, so that both rods B and B' now advance relatively to said slot E.

This does not however immediately affect the timing of the exhaust valve, as the slot E of the exhaust cam D is sufficiently large to allow a certain amount of free movement of the rods B and B', the cam being driven as before by the teeth Z' of the part Q which is fixed to the shaft A.

When the reversing shaft A' has been moved to the position of Fig. 4ᵇ sufficiently beyond the position of Fig. 4ᵃ as to cause the opening cam C for the inlet valve to advance through about 50° from its fully retarded position, this will cause the rod B to advance 50° relative to the slot E, and for this position of the valve gear the opening of the inlet valve will occur when there is still about 27% of the exhaust stroke of the piston to be traversed before reaching the dead centre, (or in other words, when the crank of the engine mainshaft has about 62½° to go before reaching its dead centre). The engine is still assumed to be moving in the forward direction, although the driving effort is in the backward direction thus producing a decelerating force.

In this condition, when the reversing shaft is in the position of Fig. 4ᵇ, with the engine moving forwards, then the extremity of the rod B will just contact with the forward extremity of the slot E of the exhaust cam D (Fig. 7).

If the reversing shaft A' be moved beyond the position of Fig. 4ᵇ, the engine still moving forward, then the extremity of the rod B will now effect the driving of the exhaust cam, and will continue to do so for all positions of the reversing shaft A' between that shown in Fig. 4ᵇ and the fully reversed position (Fig. 4ᶜ) in which the degree of back steam is a maximum, that is the angle turned through by the crank of the engine mainshaft from the time of opening of the inlet valve up to the top dead centre, is a maximum.

With the reversing shaft A' in the position of Fig. 4ᶜ, due to the said movement of the rod B, the exhaust cam D' will have advanced an angular distance of about 45° in front of the driving teeth Z' of the part Q.

Throughout the above described operation of the valve gear, it has been assumed that the engine has always been moving in the forward direction, so that the sleeves M and M' have been kept in their positions by the straps K and K' bearing against the flanges Y and Y'. Now, when actual reversal of motion of the engine takes place, then, due to the above-mentioned play between the flanges X and Y and flanges X' and Y', the sleeves M and M' at the time of and during the reversal of motion, will exert no driving force on the cams C and C', and thus owing to the effect of the screw V, said sleeves will be moved longitudinally until the sleeve M bears with its flange X against the strap K and the sleeve M' bears with its flange X' against the strap K' (unless the sleeve M' is in such a position as to bear directly against the cam D).

The effect of the reversal of motion of the engine upon the exhaust cam D will be that said cam D will remain stationary at the time of the reversal until it is driven in the backward direction by the teeth Z' of the piece Q acting upon the teeth Z of the cam at the ends thereof opposite to those engaged when driving in the forward direction. In some cases the cam D may be driven in the backward direction by the extremity of the rod B' which extends into the slot E.

It has previously been explained that it is necessary to provide means to prevent the closing cam for the inlet valves from being advanced relative to the shaft A at the moment of closing one of the valves.

The means for this purpose previously described have consisted of the spring R operating on the arms L of the levers G (see Fig. 6).

In order to further ensure that there shall be no relative advance of the closing cam, the straps K and K' and sleeves M and M' may be formed as shown in Fig. 9.

These sleeves and straps are to be used in combination with the three armed levers (G₁, G₂ L) and the spring R as shown in Fig. 6.

The object of the arrangement of sleeves (M, M') and straps (K, K') shown in Fig. 9 is to maintain the sleeves M and M' pressed against the straps K, K' or against one strap and the cam C' or cam D in such direction that said sleeves are as fully retarded as possible relative to the direction of rotation of the distribution shaft A.

In Fig. 9 the sleeve M is supposed to be in contact with the cam C' (not shown), as is the case in Fig. 1.

As shown in Fig. 9 the flanges X and Y' of the sleeves M and M' respectively are each undercut or recessed at m and m' thus providing annular chambers into which may loosely fit the corresponding sides of the straps K and K'.

During the forward motion of the engine, the strap K tends to push the sleeve M towards the cam C'; and during the backward motion of the engine the strap K' tends to push the sleeve M' towards the cam D.

Lubricating oil is caused to flow between the sleeves and the straps, and between the recesses or annular chambers (m, m') of the sleeves, and the sides of the straps; and this lubricating oil tends to make an air tight joint that prevents the quick disengagement of said parts (M, K and M', K') by opposing an obstacle to the quick inrush of air to said chambers (m, m').

In addition to said pneumatic effect, there is added the effect of adhesion between the polished surfaces, and the capillary forces induced by the lubricating fluid which is spread as a thin viscous layer. These forces combine to give a dash-pot effect which opposes any quick separation of said parts (M, K or M', K').

Suppose that the spring R and co-acting arms L are replaced by any other system of forces for pressing the two opposed beams simultaneously against the cams with equal forces, then there can only be an accelerating impulse during the closing of a valve. For during the opening of a valve, its valve-spring is being compressed, and thus this valve-spring must act to oppose the movement of the mechanism actuating it, that is to say the valve-spring acts to oppose the forward movement of the cam, or in other words to retard the cam. Therefore only the cam which controls the closing can be under these impulses; thus during forward running only the sleeve M' could leave the strap K', while in backward running only the sleeve M could leave the strap K. Even at the lower speeds of the engine the accelerating impulses are of very short duration, while during all the remaining period of rotation there are some delaying forces (friction or otherwise) so that the pneumatic action and the like as aforesaid are more than sufficient to avoid an advance of the cam C' (i. e. the moving of the side Y' away from the strap K') in forward running and an advance of the cam C (i. e. the moving of the side X away from the strap K) in backward running. The construction allowing for the play of the parts for effecting the longitudinal displacing of the sleeves and for the advancing of the exhaust cam is necessary in order to obtain a constant lead and an efficient regulation of the exhaust, without special and complicated gearings.

Having now described my invention what I claim as new and desire to secure by Letters Patent is:—

1. A valve gear for reversing and double acting elastic fluid engines, comprising in combination, exhaust valves, means for actuating such valves, two inlet valves, two like cams mounted loosely upon a driven shaft and adapted to operate such inlet valves, means whereby one of such cams controls only the opening of such valves during forward running and only the closing of such valves during backward running, and the other of such cams controls only the opening and closing in the opposite directions of running, such means comprising two members pivoted intermediate their ends and mounted in opposed relation one on each side of said cams, with two diametrically opposed extremities of the two members engaging with one cam and the other two diametrically opposed extremities of the two members engaging with the other cam, means whereby each of such extremities has two positions of rest, one position being farther from the axis of rotation of the cams than the other, and whereby as each extremity of a pivotal member passes from one of the two positions to the other, the diametrically opposed extremity of the other pivotal member makes the reverse movement, and means whereby the said pivotal members are respectively adapted to actuate the said inlet valves, means whereby the two cams may be moved angularly upon their shaft for regulating and reversing, a regulating crank mechanism for controlling such means, a lost motion device between the regulating crank mechanism and the cams, and means for preventing any relative movement of the parts allowed by such lost motion, during normal running of the engine.

2. A valve gear as claimed in claim 1, wherein the two pivotal members are each provided at their extremities with rollers to engage with the respective cams.

3. A valve gear as claimed in claim 1, wherein the means for normally preventing relative movement of the parts actuating the inlet valves due to the lost motion device comprises a resilient member, two lever arms engaging such resilient member and connected respectively to the two pivotal members operated by the cams for the inlet valves, and means whereby the resilient member acts upon such arms with a variable leverage, such that the forces tending to accelerate the movement of the cams and thereby tending to effect relative movement between the aforesaid members are counteracted.

4. A valve gear as claimed in claim 1, wherein the means whereby the two cams may be moved angularly upon their shaft by the regulating crank mechanism comprises a screw threaded control member, two sleeve members mounted upon and engaging with such screw threaded member, a driving connection between such sleeve members and the two cams respectively, associated members adapted to move such sleeve members in either of two directions, and a positive connection between such associated members and the regulating crank mechanism, the lost motion device consisting of the provision of a definite amount of play between the associated members and the sleeves respectively, and the means for normally preventing relative movement of such members due to such lost motion comprising a resilient member, two lever arms engaging such resilient member and connected respectively to the two pivotal members operated by the cams for the inlet valves, and means whereby the resilient member acts upon such arms with a variable leverage, such that the forces tending to accelerate the movement of the cams and thereby tending to effect relative movement between the aforesaid members are counteracted, said means for preventing relative movement between the sleeve members and their associated members, being reinforced by additional means comprising co-acting surfaces on such members having fluid therebetween, whereby a dash-pot action is exerted, which tends to prevent the moving apart of such surfaces.

5. A valve gear as claimed in claim 1, wherein the means for actuating the exhaust valves comprises a cam member, two members diametrically opposed relatively to the cam adapted to be actuated by the cam and to actuate the exhaust valves, means whereby the said cam may be driven direct from the shaft on which the inlet cams are mounted, means whereby the said cam may be driven through the intermediary of the inlet cams, a lost motion between the cam and its driving member, and means whereby relative movement due to such lost motion between the exhaust cam and its driving member is normally prevented.

6. A valve gear as claimed in claim 1, wherein the means for actuating the exhaust valves comprises a cam member, two members diametrically opposed relatively to the cam adapted to be actuated by the cam and to actuate the exhaust valves, means whereby the said cam may be driven direct from the shaft on which the inlet cams are mounted, means whereby the said cam may be driven through the intermediary of the inlet cams, a lost motion between the cam and its driving member, and means whereby relative movement due to such lost motion between the exhaust cam and its driving member is normally prevented, such means comprising an auxiliary cam rigidly connected to the exhaust cam, a thrust member of an auxiliary mechanism, means whereby such thrust member engages such cam member, and a resilient member tending to force such thrust member into engagement with such cam member, the arrangement being such that the force due to the members acting on the cam tending to accelerate its rotary movement is always counteracted by the forces due to the said thrust member tending to delay such movement.

In testimony whereof I have signed my name to this specification.

ARTURO CAPROTTI.